(12) United States Patent
Bhosle et al.

(10) Patent No.: US 8,505,106 B1
(45) Date of Patent: Aug. 6, 2013

(54) CROSS SITE REQUEST FORGERY MITIGATION IN MULTI-DOMAIN INTEGRATIONS

(75) Inventors: Amit Bhosle, Bellevue, WA (US); Scott G. Carmack, Bainbridge Island, WA (US); Dhanvi Harsha Kapila, Seattle, WA (US); Shilpi Gupta, Bangalore (IN); Mehul Jain, Bengaluru (IN); Sachin P. Joglekar, Bothell, WA (US); Ashish Agrawal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 12/827,526

(22) Filed: Jun. 30, 2010

(51) Int. Cl.
*G06F 17/30* (2006.01)
*G06F 15/16* (2006.01)
*H04L 9/32* (2006.01)

(52) U.S. Cl.
USPC .......... 726/28; 726/3; 713/176; 713/169; 709/206; 709/248

(58) Field of Classification Search
USPC .......... 709/225, 229; 713/168–174, 182–186, 713/202; 726/2–8
See application file for complete search history.

(56) References Cited

U.S. PATENT DOCUMENTS

| | | | |
|---|---|---|---|
| 5,708,780 A | 1/1998 | Levergood et al. | |
| 6,266,773 B1 | 7/2001 | Kisor et al. | |
| 7,743,153 B2 | 6/2010 | Hall et al. | |
| 8,051,465 B1 | 11/2011 | Martin et al. | |
| 2003/0004874 A1 | 1/2003 | Ludwig et al. | |
| 2003/0208562 A1 | 11/2003 | Hauck et al. | |
| 2008/0115201 A1 | 5/2008 | Sturms et al. | |
| 2009/0271847 A1* | 10/2009 | Karjala et al. | 726/6 |
| 2010/0251143 A1 | 9/2010 | Thomas et al. | |
| 2012/0030732 A1* | 2/2012 | Shaty | 726/3 |
| 2012/0159177 A1* | 6/2012 | Bajaj et al. | 713/176 |

* cited by examiner

*Primary Examiner* — Evans Desrosiers
(74) *Attorney, Agent, or Firm* — Kilpatrick, Townsend & Stockton, LLP

(57) ABSTRACT

Systems and methods for authenticating a request submitted from a client device through a third party content provider to an electronic entity are described. In one embodiment, a method includes providing a trusted script to the third party content provider, passing a trust token to the third party content provider and to the client device, and, in response to a request submitted from the client device through the third party content provider, validating the trust token associated with the request with the token passed to the client device, and processing the request. The trusted script is configured to create a trusted window on the third party Web page displayed on the client computing device, receive a trust token from the electronic entity through the trusted window, and associate the trust token with requests submitted from the client computing device through the third party content provider to the electronic entity.

18 Claims, 6 Drawing Sheets

CROSS SITE REQUEST FORGERY MITIGATION IN MULTI-DOMAIN INTEGRATIONS

BACKGROUND

As the number of users viewing information and purchasing items electronically increases, there is also an increasing amount of forgery, misuse of identity information, and other illicit activities in various electronic environments. Forced unauthorized commands or submissions from a trusted user of a Web site, for example, is often referred to as Cross Site Request Forgery (CSRF or XSRF). Typically, the submission is made to originate at the Internet protocol (IP) address of the user, such that the actual initiator of the submission is untraceable. The attacks often affect Web sites that use mechanisms such as state management, Web cookies, browser authentication, or client-side certificates to authenticate users. A CSRF exploit can, for example, be executed by tricking or otherwise causing a user to submit malicious data to a trusted Web site. The exploit typically originates at a malicious site, as a malicious payload in a file such as a hypertext markup language (HTML) or JavaScript file, which can contain script code triggering an action to be performed on a third-party site on behalf of the victim.

In some instances, a user might be using a third party Web site or playing an online game that allows the user to generate submissions to a specific Web site. For example, a user might be able to request a purchase of an item from an electronic marketplace by selecting a hyperlink or other element on a third party Web site. The hyperlink or other element that is used by a user on a third party Web site to request a purchase may be owned by the third party and not by the electronic marketplace. However, because the electronic marketplace might want to allow purchasing via a third party Web site to increase revenue, etc., it is desirable to allow processing any requests that originate from outside of the electronic marketplace. Therefore, it is desirable for the electronic marketplace to have a capability for secure processing of requests or submissions that are free of CSRF and originated by a user action on a hyperlink or other element residing on a third party Web site and owned by the third party. In order to reduce the likelihood of fraud the electronic marketplace might want to verify the user request submission before processing. Thus, there is a need to establish a trusted, secure communication channel between the electronic market place and the third party that would ensure secure propagation of a trust token randomly generated by the electronic marketplace and submitted to the third party to be included in a hyperlink or other element used by a user to submit requests to the electronic marketplace.

BRIEF DESCRIPTION OF THE DRAWINGS

Various embodiments in accordance with the present disclosure will be described with reference to the drawings, in which.

DETAILED DESCRIPTION

Figure 1:
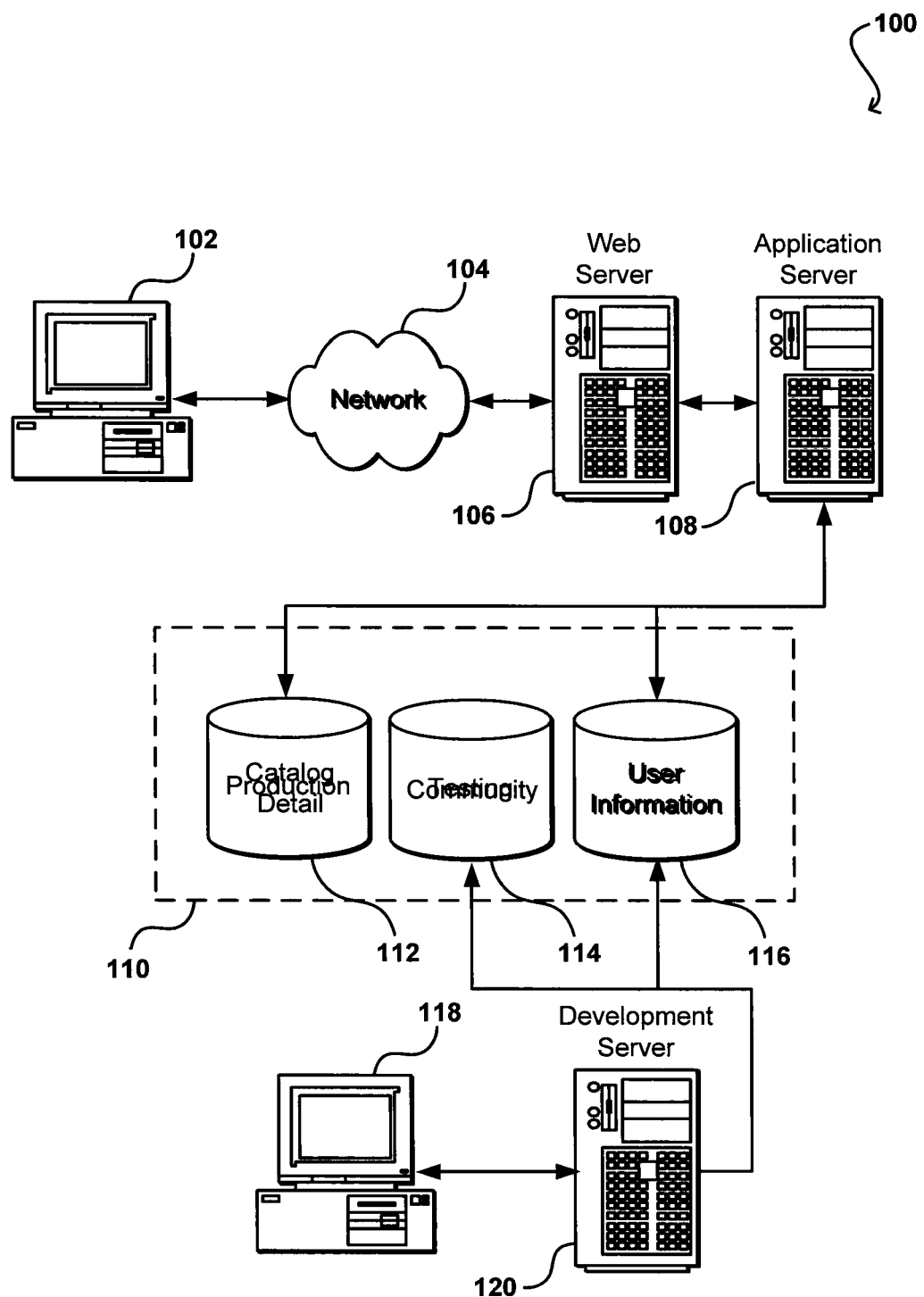
FIG. 1 illustrates an environment in which various embodiments can be implemented.

Systems and methods in accordance with various embodiments of the present disclosure provide approaches to mitigating fraudulent, deceptive, or other unauthorized activity in an electronic environment. Systems and methods in accordance with various embodiments provide approaches for validating the source of a received submission utilizing information that is, in many cases, already available to trusted users. For example, session or state information is often maintained when a user accesses an application, page, site, or process across a network. In an Internet-based example, a user might have a session identifier ("ID") or other state identifier or state information generated by the accessed server when the user logs in to, or otherwise accesses or is authenticated to, a Web site, Web page, application, online game, etc. A session ID in one embodiment is a pseudo-random number, alphanumeric identifier, etc., which can be used as an index into a data store that contains session and/or state information for a user. The session ID may be included in a validation or trust token used to authenticate a user access request.

In many cases, the session ID will be stored locally on a client device of the user, such as in a "cookie" (e.g., web cookie, HTTP cookie, etc.) or other such validation token for a browser, application, or interface on the client device. Generally, a "cookie" refers to a piece of text generated by a server and sent to a client application on a client device, which is stored locally on the client device and can be sent with any subsequent request from the client device back to that server, address, or other related location or device. Cookies can be used to store information such as user identification information, authentication information, session information, and user-specific information, such as personalization information, preference information, etc.

When a user logs in or is otherwise authenticated to a site, application, etc., a component such as a Web server can generate a session ID that is sent to the client device and stored in a cookie. The Web server can also store the session ID and other state or session information locally to the Web server, or on the "server side". In one example, all active session IDs are stored to a state table or data store on the server side. In this way, the session information can be determined for any request that is received by the Web server, such that the Web server or any other device or process on the server side can access related information for the user. The security of a user's session in such an embodiment is directly reliant upon the security of the cookie, such as a session tracking cookie, or other validation token storing the session ID or other validation information on the client device. If that token is compromised, security of the user's session is also compromised. Therefore, it is reasonable to base security decisions on such a token.

In other embodiments, the session ID or validation information can be stored as one or more variables inside a page, script, or other grouping of content or instructions. In some embodiments, a page that is viewable in a browser or similar application can be rendered in a "sandbox," or in a source-specific environment. Thus, certain portions of a page can only be accessed from the context (e.g., domain) associated with the origin or entity generating or otherwise providing the page of content. A session ID can be stored in any appropriate portion(s) of the page that are inaccessible to sources, domains, or other environments other than the source environment. When a user performs an action that causes a submission to be generated, the submission can include the session ID retrieved from that portion of the page that is inaccessible to an external environment. Further, in some embodiments the scripting on the page can be configured in a way such that the scripts cannot be executed from an external environment.

Systems and methods in accordance with various embodiments take advantage of the fact that state information can be stored at both the client and server sides to validate the source of any received submissions, and thus mitigate or otherwise reduce the number of fraudulent submissions that are received purporting to be submitted on behalf of an unknowing user. For example, a user visiting a malicious site can expose information that allows a fraudulent request to be submitted to a Web site on behalf of the user. If the request does not include the proper state information, however, a Web server or other such device or process can determine that there is something questionable or unusual about the request and can perform an action such as rejecting the request.

While examples will be discussed generally with respect to Internet-based technologies, such as Web sites, client browsers, Web cookies, etc., it should be understood that advantages of the various embodiments can be obtained for any appropriate electronic environment wherein requests, messages, or other packets of electronic information are submitted from one address or location to another address or location, and it is possible for a person, device, or process to send such a packet of information in a way that makes it appear as if the packet came from a different source, user, etc.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple associates or other content providers might wish to offer users the opportunity to not only buy directly from the marketplace, but also to rate items, submit reviews, purchase items via an associate's site, etc. As discussed above, however, a provider such as an electronic marketplace typically will want some control over actions performed on behalf of a trusted user or customer. The electronic environment in such a case might include additional components and/or other arrangements, such as those illustrated in the configuration 200 of FIG. 2. In this example, devices such as a user client device 202 and 204 are able to access an entity 208 across a network 206. The "entity" as it will be referred to herein can include any appropriate combination of systems, services, devices, processes, and/or components for receiving requests across the network and serving responses in response thereto. Such an entity might provide a Web site or electronic marketplace, for example, or could in some embodiments include an enterprise application, a company's electronic presence, a database application, etc., as discussed elsewhere herein. Further, while the present embodiment is discussed with respect to an electronic marketplace, it should be apparent to one of ordinary skill in the art in light of the teachings and suggestions contained herein that advantages and aspects of the various embodiments can be used with any of a variety of other such entities, sites, providers, etc., such as may include online banking sites, electronic or online gaming, content providers, electronic auction sites, and similar endeavors.

In this example, the entity 208 includes at least one server 210, such as a Web server or application server, able to receive requests from across the network 206. While described with respect to a network such as the Internet, it should be appreciated that this also could be an intranet or local area network (LAN), for example. The server in this example communicates with a script or page generator 216 that is able to access information in any appropriate data store, such as a user data store 218 or session data store 214, and generate information to be sent to a client device for display. The entity can include a data manager 220 that is able to manage data such as user data, item data, production data, etc., and store that data to at least one data store such as the user data store 218. The entity in this example also includes a session manager 212 able to manage session information for any user, process, request, etc., and store that session information to the session data store 214. While these components are shown as separate components, it should be understood that components such as the session manger, page generator, and data manager can be separate or common applications or processes running on a single device or multiple devices, and that information such as the user data and session data can be stored in separate data stores, as separate tables in a single data store, across a distributed data system, etc. Such an entity typically will include additional components and processes known in the art for such environments, and can include any of a number of variations within the scope of the various embodiments.

In various embodiments, the page generator 216 can generate code or script that is programmed to execute on the client device 202, such as in a browser application. For example, code can be delivered to the client that is written using asynchronous JavaScript and XML, commonly referred to as AJAX, which enables client-side scripting or interactive applications to be executed on the client device 202. Using client-side scripting technology, applications can submit requests to an entity 208 or other such source without submitting an HTML form or other such submission that result in the generation of a new page for the client. Thus, a user can interact with elements on a page without having to re-render the page, wait for code for the new page to download, etc. The scripting language can provide a seamless interaction with "server-side" components that can occur in the background, often without the user being aware that a request or submission is generated. Often, a response can be received that causes an element on the page to update or change using the scripting language, without having to load and/or render a new page. For example, if a user selects a rating for an item, the user can see the rating for the item displayed on the page without the page being reloaded, etc., and the rating can be submitted to a remote entity, for example, without any indication of the submission to the user. It should be understood that various scripting languages and client-side scripting techniques can be used, and that the requests do not have to be asynchronous in all embodiments.

When a client-side script is executing on a client in an application such as a browser, for example, the script can function as an application that is able to send requests to a Web site, domain, or other such source, and receive responses from that source. In many cases, an application such as a browser can enforce "same origin" or similar technology for such applications, whereby only components or entities having the same origin or context (e.g., domain) can access, execute, and/or interact with the scripting language. This is sometimes referred to as "sandboxing" the script, where the script can only interact or "play" with other components or scripts residing in the same context, or in the same "sandbox." Typically, the script will be sourced from a particular entity, domain, set of servers, etc. The script can be pushed or pulled to the browser, which can execute the script in the context in which the script was sourced. When the script makes a request to the source entity, such as may be in response to a user performing a specific action with respect to a page or other rendering of content, a response can be returned that includes a session identifier (ID) or other such validation token (also known as "trust token") once a validation, authentication, or similar process is executed by the entity or a component or service in communication therewith. The session ID then can be included in subsequent requests from the scripting language, such that a validation or similar process does not have to be re-executed for each subsequent request.

In some instances, a user may be accessing a Web site owned by a third-party merchant (content provider) and associated with the entity 208. For example, a user might be able to request a purchase of an item from an electronic marketplace provided by the entity 208 by selecting a hyperlink or the like element on a third party Web page rendered by the Web site. The hyperlink or other element that is used by a user on a third party Web page to request a purchase may be owned by the third party and not by the entity 208. In other words, the hyperlink or the like element may be owned by a domain which is external to the entity 208.

Figure 2:
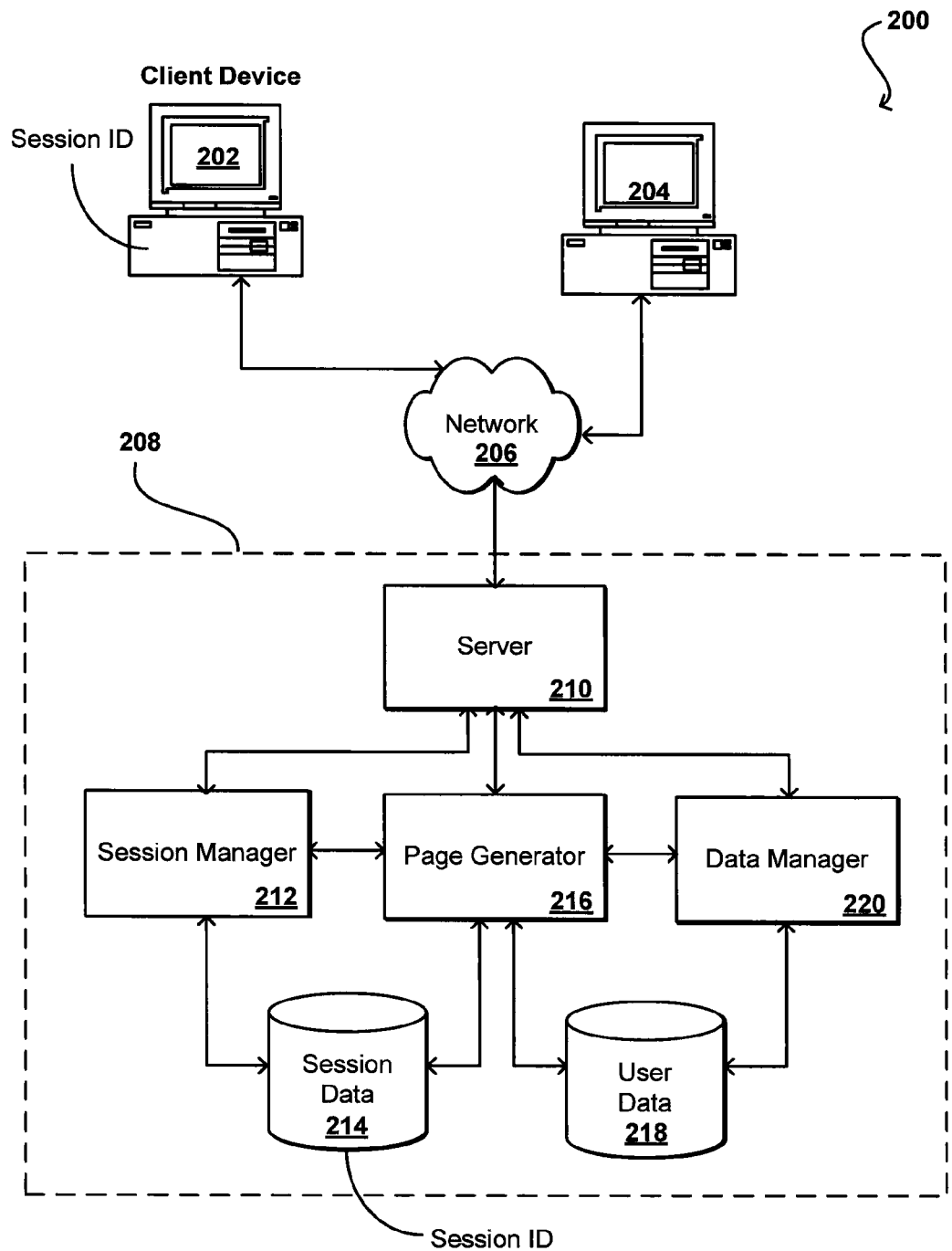
FIG. 2 illustrates components for analyzing submissions that can be used in accordance with one embodiment.
Figure 3:
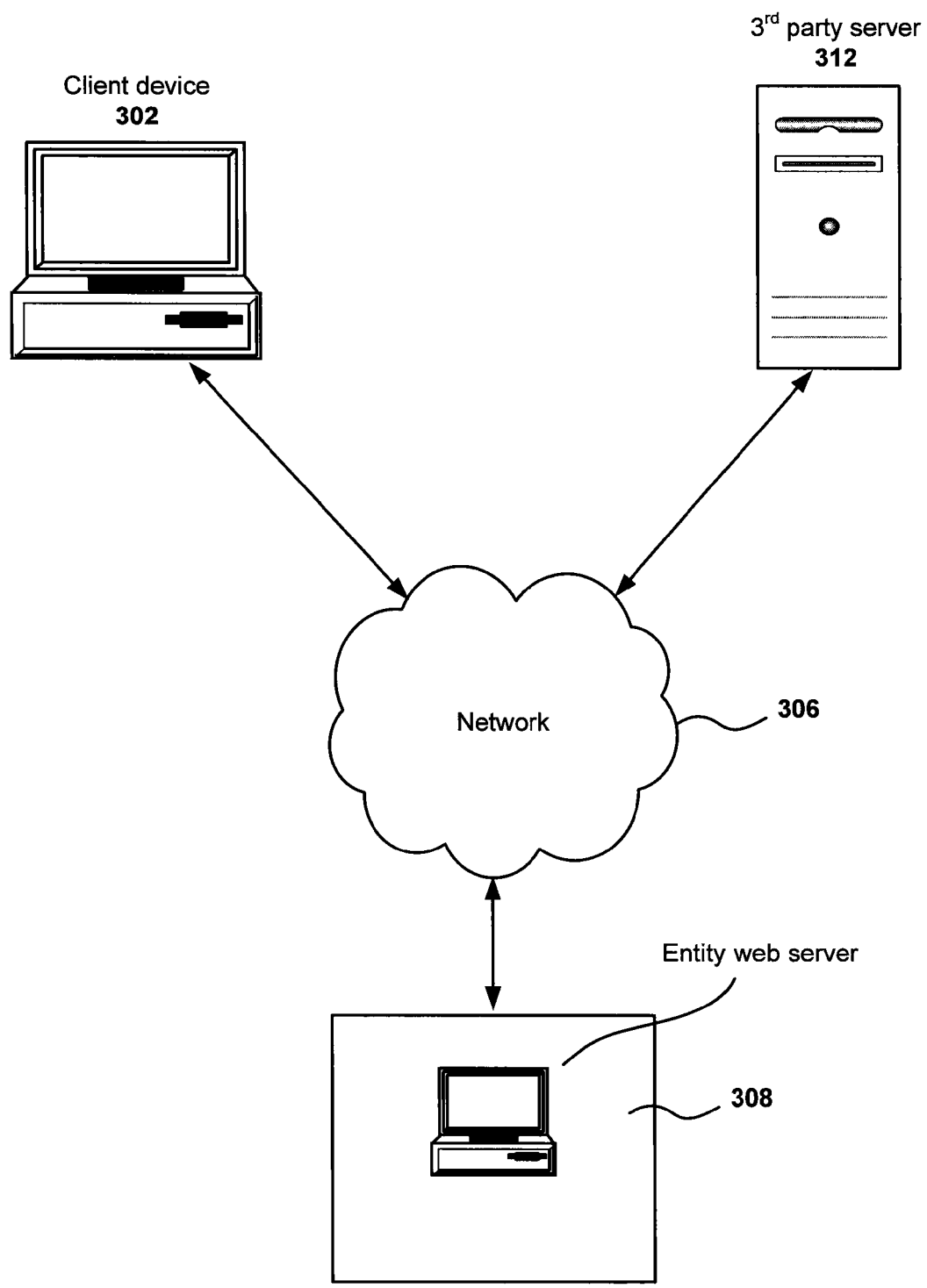
FIG. 3 illustrates an environment in accordance with one embodiment, in which a user at a client computing device accesses a Web site owned by a third party content provider and associated with an electronic marketplace.

FIG. 3 illustrates an example of an environment in which a user accesses a Web site, which is owned by a third party merchant (content provider) and associated with an electronic marketplace rendered by an entity described in FIG. 2. In this example, a third party merchant Web server 312 having a domain external to the electronic marketplace serves Web pages of a Web site to a client device 302 through a network 306. One skilled in the art will appreciate that the third party Web site may include a number of elements similar to those illustrated in FIGS. 1 and 2 and described hereinabove. The entity 308 that provides the electronic marketplace may render a feature or element to the third party Web site. For example, the entity 308 through its Web server may render a "shopping cart" feature or any other feature suitable for online purchasing to the third party Web site. The third party content provider through its Web server 312 may provide features, links, or elements needed to operate a feature rendered by the entity 308.

In the above instance of a "shopping cart" feature owned by the entity 308, the third party Web server 312 may provide, for example, an "add to cart" button rendered with the Web site to the client device 302. One skilled in the art will recognize that any feature that would facilitate online purchases on the third party Web site may be rendered by the third party Web server. Such features may be executed in a meta markup language such as HTML, XML, XHTML, or the like. In this scenario, the entity 308, while configured to process purchase requests initiated by the user (for example, by using the "add to cart" button), does not have control over the "add to cart" button or similar feature. Thus, CSRF attempts are possible that would utilize a feature owned by a third party merchant and not controlled by the entity 308.

To mitigate CSRF attempts, the entity 308 needs to establish a secure communication channel between the entity 308 and the third party content provider's Web server 312 for safe propagation of a validation (trust) token described above so that the validation token is not made available to a bad actor intent on a CSRF attempt. One embodiment of the secure exchange of a validation token between an entity such as the entity 308 and a third party content provider ensuring a validity of a user request will be described with reference to FIG. 4.

Figure 4:
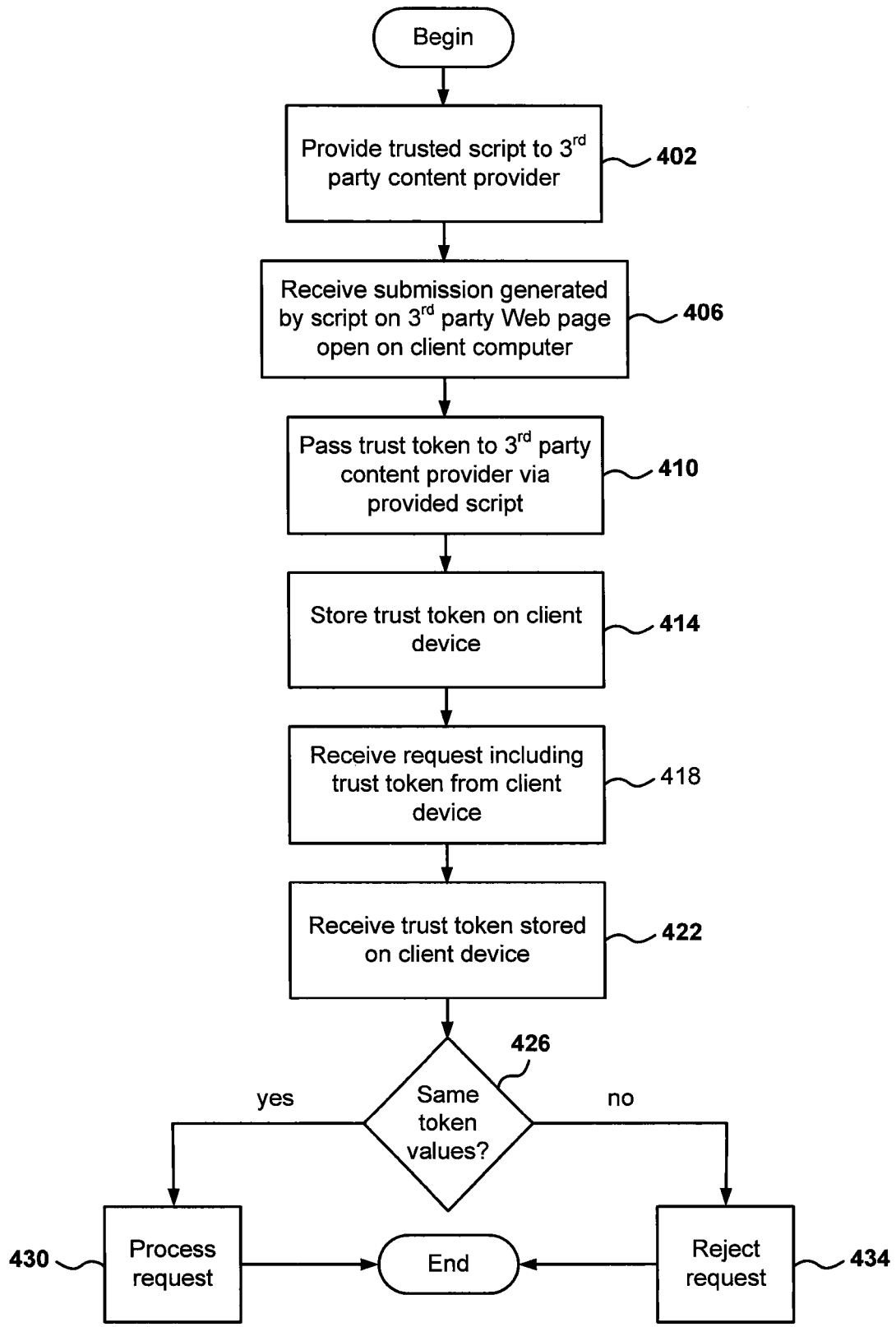
FIG. 4 is a process flow diagram illustrating an operation of an electronic marketplace Web server in accordance with one embodiment.

FIG. 4 is a process flow diagram illustrating an example of a technique used to prevent processing of an unauthorized submission by a person or process posing as a trusted user in a system described above in reference to FIG. 3. The process begins at block 402, where a Web server associated with an entity such as the entity 308 provides a trusted script to the third party Web server that serves the Web site to the client device 302. The trusted script may include any scripted program executable on a Web browser, such as a program written in JavaScript scripting language or other suitable programming language. The trusted script is configured to create a trusted window or other trusted element in the Web site served by the third party merchant Web server. In one embodiment, the trusted script, when executed, creates a trusted window, such as, for example, an inline frame or iframe that sources to a domain of the Web server associated with the entity (hereinafter "entity Web server"). The trusted window may be hidden or visible to the user operating the client device 302. A window may be hidden by setting its width and height to zero or by setting its visibility to hidden in the style sheet. A hidden window, even though not visible, can be used as a buffer for loading external content to be used by or incorporated into a document in any number of possible ways.

Figure 5:
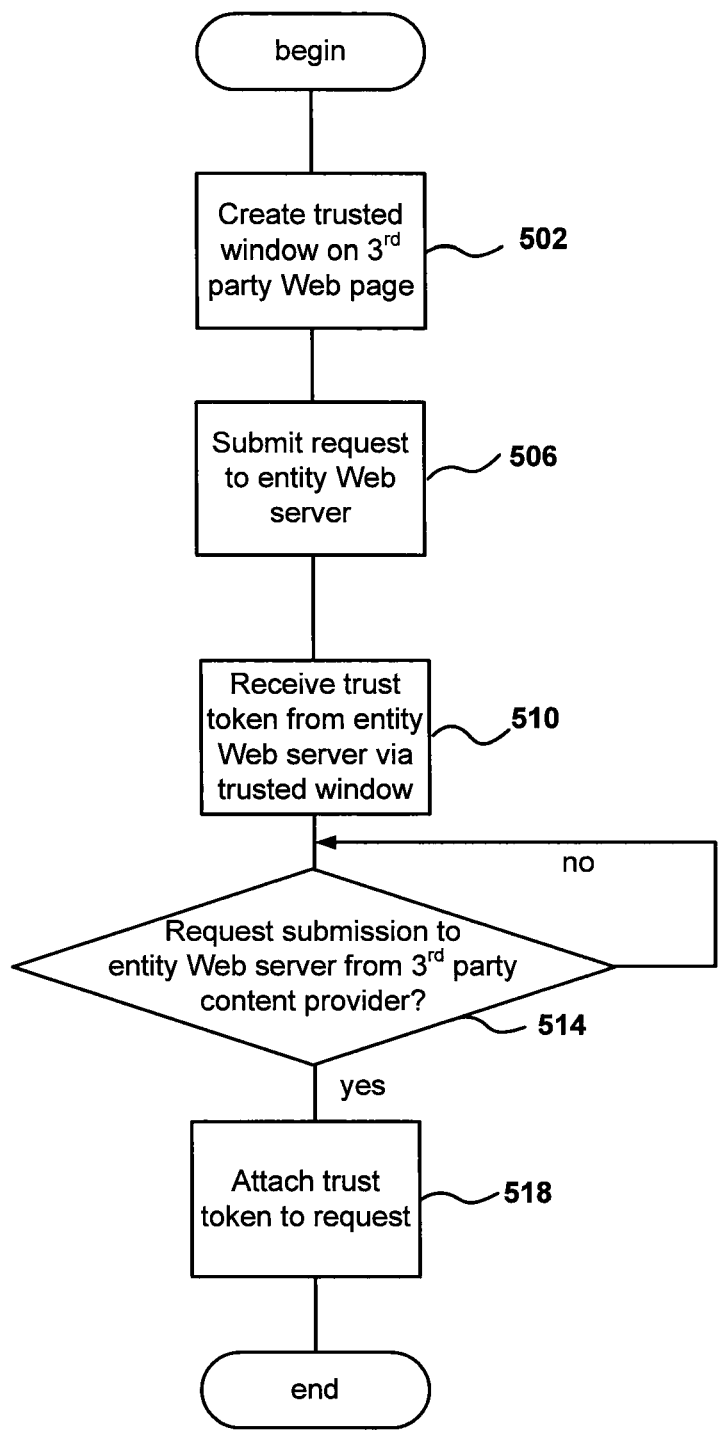
FIG. 5 is a process flow diagram illustrating one example of operation of a trusted script on a third party Web page in accordance with one embodiment.

The operation of a trusted script on a third party Web page will now be discussed in reference to FIG. 5 As discussed above, the trusted script may be configured to create a trusted window in the Web page served by the third party content provider's Web server. In one embodiment, the trusted script, when executed, creates a trusted window that sources to a domain of the entity Web server (block 502). The trusted window may be hidden or visible to the user operating the client device 302.

Next, the trusted script, when executed, sends a message, such as a form post or other type of submission, to the entity Web server at block 506. At block 510, in response to the message, the trusted script receives the trust token from the entity Web server via the trusted window. The trust token may be passed from the trusted window to the trusted script in a number of different ways known to those skilled in the art. At decision block 514, it is determined whether a request has been submitted to the entity Web server from the third party Web site. A request may be submitted by a user on a client computer via the third party Web site. For example, a user may request a purchase of an item from an electronic marketplace by selecting a hyperlink or other element on a third party Web site. If such request has been made, at block 518 the trusted script adds the trust token to the request. The token may be added to the request in a number of different ways. For example, the trusted script may choose to add the token in all form elements (or URLs) in advance or it may intercept the request and attach a token before passing the request on to the entity Web server. Further trust token validation is performed by the entity Web server as discussed below in reference to FIG. 4.

Returning to FIG. 4, at block 404, the entity Web server receives the message generated by the trusted script on the third party Web site. In response to receipt of the message, at block 406, the entity Web server validates the third party. The third party validation is a security measure aimed at ensuring that only pre-authorized third parties participate in the process described in FIG. 4. The illustrative implementations of the third party validations will be described below in greater detail. At decision block 408 it is determined whether the third party is valid. If the third party passes the validation test, then at block 410 the entity Web server passes a trust token to the third party Web site via the trusted window. This passage can be accomplished in a number of different ways known to those skilled in the art depending on a particular browser capabilities. For example, some browsers, such as Firefox 3®, Safari®, or Internet Explorer 8®, support a method for safely enabling cross-origin communication between different Web pages, known as the window.postMessage Application Programming Interface (API). In this case, the iframe element can communicate the trust token to the Web site using the window.postMessage functionality. For the browsers that do not support that functionality, the trust token may be simply written in the Web site's Uniform Resource Locator (URL). The trusted script then can read the token from the Web site's URL. The trust token may be passed to the Web site through other mechanisms known in the art.

At block 414, the entity Web server stores the trust token on the client device. As discussed above, the trust token may be stored in a number of different ways, such as, for example, in a "cookie." At block 418, the entity Web server receives from the client device a request that includes the trust token. As will be described below in greater detail, the trusted script ensures that a request submitted to the entity Web server includes the trust token. At block 422, the entity Web server receives from the client device the trust token stored on the client device in a cookie or by any other method known in the art. The receipt of the trust token from the client device may be ensured by a session protocol that would prescribe a submission of the trust token stored on a client device along with a request submitted to the entity Web server. Finally, at decision block 426, the entity Web server validates the token received with the request by comparing the token received from the client device. If such validation is successful, the entity Web server proceeds to process the request at block 430. If the validation is unsuccessful, at block 434 the entity Web server rejects the request as a CSRF suspect.

Figure 6:
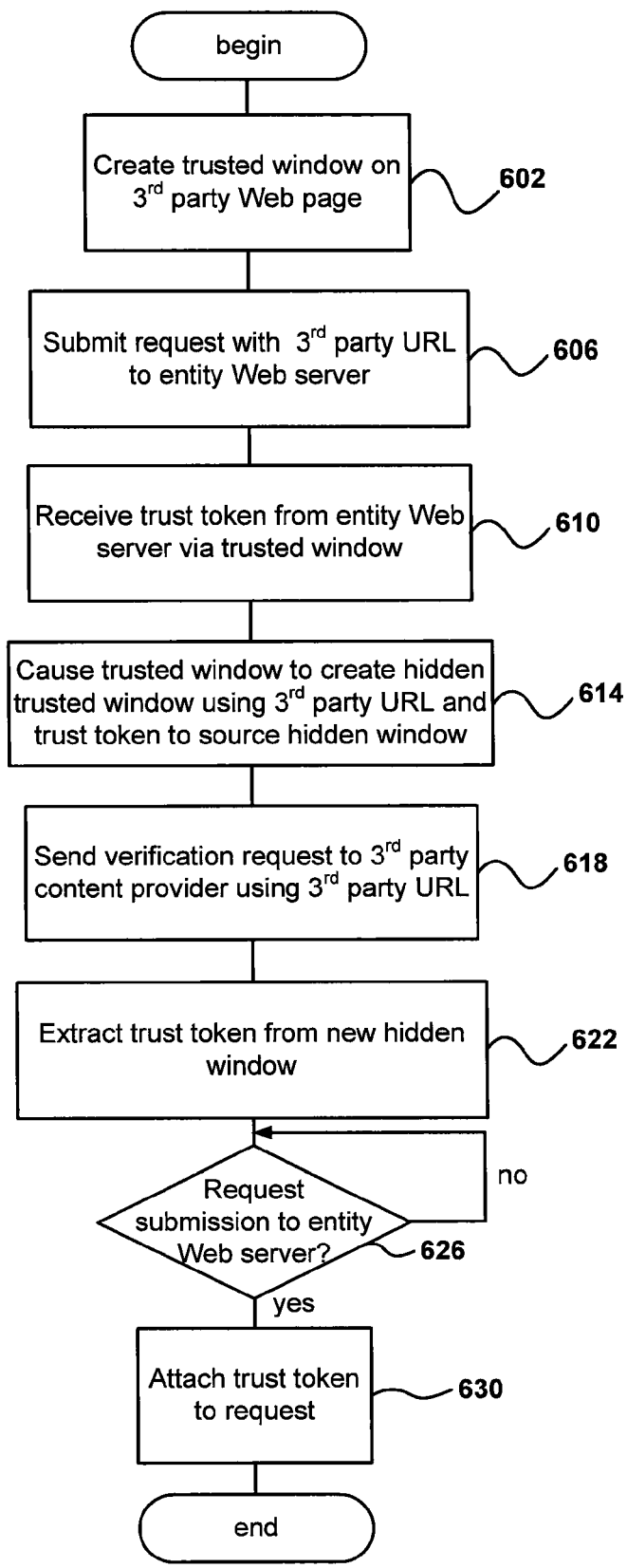
FIG. 6 is a process flow diagram illustrating another example of operation of a trusted script on the third party Web page in accordance with one embodiment.

In some instances, a third party content provider's Web site may itself be hosted by (e.g., embedded in) an affiliate Web site. In this instance, certain browsers, such as, for example, Internet Explorer® 7, may restrict navigation of subframes, or iframes, embedded in respective Web sites across different domains, which would impede communication between a third party Web site and the host Web site. To obviate this impediment, the trusted script may be configured to operate as illustrated in FIG. 6 and described below.

At block 602, the trusted script creates a trusted window on a Web page rendered by the third party content provider and hosted by the affiliate Web site. The trusted window sources to the domain of the entity Web server and therefore is "trusted" by the entity Web server. At block 606, the trusted script submits a message containing the third party URL ("shared URL") to the entity Web server. In response, at block 606, the trust token is received from the entity Web server. The trusted script needs to be able to read the trust token. In order to do this, at block 614 the trusted script causes the trusted window to create a new trusted window in its own domain. In one embodiment, the new trusted window may be a hidden window. The shared URL and the trust token are used to source the new trusted window. The URL of the new trusted window may be dynamically generated. In order to enable the new window, a verification request is sent to the third party content provider using the shared URL (block 618). When the request is verified, the new hidden window is enabled and may be accessed by the trusted script. As a result, the trusted script may access the new trusted window and read the trust token from the new trusted window (block 622). The process then continues at blocks 626 and 630 as discussed above in reference to blocks 514 and 518 of FIG. 5.

As noted above in regard to blocks 406 and 408 of FIG. 4, security measures may be used to ensure that only pre-authorized third party Web sites receive a trust token and this token is unique to the end user currently associated by a user session on the entity Web server. There are different ways to ensure that the third party Web site indeed belongs to a trusted merchant (content provider) list. In one example, both the entity and third party exchange cryptographic keys out of band as part of the integration effort. The key would be unique to the third party and not shared with other third party sites. This key would also be treated as a secret and only held on the trusted third party site without direct use within any web browser. Upon negotiation for a trust token as previously described, the entity web server would encrypt the trust token created for the third party and pass it through the previously described methods. The third party would then decrypt the encrypted token and use the unencrypted version for the trusted call back to the entity web server.

In another example, so-called "white lists" of trusted merchants can be created and used for cross-checking to ensure the integrity of a third party Web site. As those skilled in the art will recognize, a "white list" or approved list is a list or register of entities that, for one reason or another, are being provided a particular privilege, service, access or recognition. A "white list" of trusted merchants may include, for example, a trusted merchant ID in combination with another identifier, such as a URL. A "white list" may be accessed for verification purposes every time a request from a third party Web site is submitted to the entity Web server. Those skilled in the art will appreciate that there are different ways of providing "white listing." For instance, a trusted third party would be added to a "white list" of partners either in JavaScript held on the entity Web server or as part of entity server side code. When the request for a trust token occurs through the means previously described, the third party would also pass in either their domain name or a key value associated with a lookup for their domain name. Upon validation by the entity JavaScript or server side logic, the code previously described to pass a trust token either through a post or using URL manipulation, will only do so to the domain with which it has a previous trust relationship. As an example, if the third party passed in abc.com as the callback domain, only upon a lookup to confirm abc.com was a trusted domain would the methods previously described execute to pass the trust token and only to that specific domain without using relative domain names in the call.

While the embodiments discussed above have related generally to tracking session information in cookies and hidden fields for a Web site such as an electronic marketplace, it should be understood that various other embodiments can include, function with, and/or address other such functionality. For example, an entity can add state validation functionality for any page, site, submission, request, etc., where an authenticated identity of the user is of importance. Any such page viewed by a user can require that any state ID present in a token or elsewhere on the client device is submitted with a request or other submission. While this can take the form of a hidden field in some embodiments, other approaches can be used as well, such as appending the state information to a uniform resource locator (URL), placing the information in a header of the request, etc. When the submission is received, a determination can be made based on the type of submission, information included in the submission, etc., to determine whether to verify a state ID before processing that submission.

A system in accordance with one embodiment also can utilize multiple session IDs. A recognition session ID might be used to track non-critical information, such as user viewing preferences, general geographic information used to display relevant content, etc. A recognition session ID might not expire, at least for an extended period of time, and might not be stored in a secure cookie. An authentication session ID might be used to verify the identity of the user, and might be stored in a secure cookie or other secure location. In this case, the authentication ID would typically be used with the submission handler and session manager to validate the source of a request, as the authentication session ID is handled securely and typically would only be valid for a relatively short period of time. Authentication session IDs can be required for processes such as purchasing items, transferring money, etc. Any submission sending an authentication session ID also can be required (e.g., by setting a cookie as secure) to be sent over a secure connection in at least some embodiments, such as a connection using a secure sockets layer (SSL) or similar secure communications protocol. Alternatively, the same session ID can be used for both authenticated and recognized scenarios, but marked on the server to indicate which the session ID represents.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP (including IPv4, IPv6 and all protocols of the general suite of protocols included in TCP/IP), OSI-appropriate protocols, UPnP, NFS, CIFS, SONET, SDH, ATM, Frame Relay, MPLS, and AppleTalk. The network can be, for example, a local area network, a wide-area network, a virtual private network, the Internet, an intranet, an extranet, a public switched telephone network, a satellite network, a cellular network (including GSM TDMA and CDMA), an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as ASP, ASPX, JSP, PHP, Perl, Python, or TCL, as well as combinations thereof. The server(s) may also include database servers, including without limitation those commercially available from Oracle®, Microsoft®, Sybase®, IBM®, and Sun®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for authenticating a request submitted through a third party content provider, comprising:

under the control of one or more computer systems configured with executable instructions,
providing a trusted script to a third party content provider, the trusted script enabling creation of a trusted window inaccessible to the third party content provider;
with the trusted script, creating the trusted window on at least one Web page associated with the third party content provider and displayed on a client computing device;
receiving, via the created trusted window, a message generated by the trusted script;
in response to the message,
validating the third party content provider;
when the third party content provider is valid, passing a trust token to the third party content provider through the created trusted window; and
providing the trust token to the client computing device; and
when a request is submitted through the at least one Web page,
with the trusted script, associating the trust token passed to the third party content provider with the request;
validating the trust token associated with the request by comparing a value of the trust token submitted with the request with a value of the trust token provided to the client computing device; and
when the validation is successful, processing the request.

2. The computer-implemented method of claim 1, wherein the request is submitted via an interactive element rendered to the at least one Web page displayed on the client computing device, the interactive element being associated with the third party content provider.

3. The computer-implemented method of claim 1, wherein the message generated by the trusted script is associated with content of the third party content provider.

4. A computer-implemented method for authenticating a request submitted via a third party content provider, the method comprising:

under the control of one or more computer systems configured with executable instructions,
receiving a first request via a trusted window, the trusted window being created and incorporated into third party content to be displayed on a client computing device by a trusted script, the trusted window inaccessible by the third party content provider;
in response to the first request,
validating the third party content provider, and
sending a trust token through the trusted window to the third party content and to the client computing device;
receiving a second request from the client computing device through the third party content, the trust token sent to the third party content being associated with the second request;
validating the trust token associated with the second request by comparing a value of the trust token submitted with the first request with a value of the trust token provided to the client computing device; and
when the trust token is valid, processing the second request.

5. The computer-implemented method of claim 4, wherein the trusted window comprises at least one of a visible window and a hidden window.

6. The computer-implemented method of claim 4, wherein the trusted script comprises a JavaScript computer code.

7. The computer-implemented method of claim 4, wherein the trust token includes a session identifier.

8. The computer-implemented method of claim 4, wherein the trust token sent to the client computing device is stored on the client computing device.

9. The computer-implemented method of claim 4, wherein the trusted window comprises an iframe element.

10. A computer system for authenticating a request submitted from a client computing device through a third party content provider to an electronic entity, comprising:

a computing device associated with the electronic entity, the computing device configured to:
receive a first request via a trusted window, the trusted window being created and incorporated into third party content to be displayed on a client computing device by a trusted script, the trusted window inaccessible by the third party content provider;
in response to the first request, validate the third party content provider and send a trust token through the trusted window to the third party content and to the client computing device;
receive a second request from the client computing device through the third party content, the trust token sent to the third party content being associated with the second request;
validate the trust token associated with the second request by comparing a value of the trust token associated with the second request with a value of the trust token obtained from the client computing device; and
when the trust token is valid, process the second request.

11. The computer system of claim 10, wherein the trust token includes a session identifier.

12. The computer system of claim 10, wherein the trusted window comprises at least one of a visible window and a hidden window.

13. The computer system of claim 10, wherein the trusted script comprises a JavaScript computer code.

14. A non-transitory computer-readable storage medium having computer-executable instructions stored thereon that, when executed by a computer, cause the computer to:

receive a first request via a trusted window, the trusted window being created and incorporated into third party content to be displayed on a client computing device by a trusted script, the trusted window inaccessible by a third party content provider hosting the third party content;
in response to the first request, validate the third party content provider and send a trust token through the trusted window to the third party content and to the client computing device;
receive a second request from the client computing device through the third party content, the trust token sent to the third party content being associated with the second request;
validate the trust token associated with the second request by comparing a value of the trust token associated with the second request with a value of the trust token obtained from the client computing device; and
when the trust token is valid, process the second request.

15. The non-transitory computer-readable storage medium of claim 14, wherein the trust token includes a session identifier.

16. The non-transitory computer-readable storage medium of claim 14, wherein the trusted window comprises at least one of a visible window and a hidden window.

17. The non-transitory computer-readable storage medium of claim 14, wherein the trusted script comprises a JavaScript computer code.

18. The non-transitory computer-readable storage medium of claim 14, wherein the second request is submitted via an interactive element displayed on the client computing device, the interactive element being associated with the third party content provider.

* * * * *